(12) United States Patent
Wang et al.

(10) Patent No.: US 11,060,905 B2
(45) Date of Patent: Jul. 13, 2021

(54) LASER DEVICE

(71) Applicant: Panasonic Intellectual Property Management Co., Ltd., Osaka (JP)

(72) Inventors: Jingbo Wang, Hyogo (JP); Doukei Nagayasu, Hyogo (JP); Yoshiaki Takenaka, Osaka (JP); Hitoshi Nishimura, Osaka (JP); Makoto Ryudo, Hyogo (JP); Kiyotaka Eizumi, Osaka (JP); Hideaki Yamaguchi, Osaka (JP); Ryo Ishikawa, Osaka (JP); Masatoshi Nishio, Osaka (JP); Takasi Kakutani, Hyogo (JP); Yasushi Mukai, Osaka (JP); Mitsuru Mukai, Osaka (JP); Hiroyuki Hayashikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 91 days.

(21) Appl. No.: 16/417,760

(22) Filed: May 21, 2019

(65) Prior Publication Data
US 2019/0271588 A1 Sep. 5, 2019

Related U.S. Application Data

(63) Continuation of application No. PCT/JP2017/041182, filed on Nov. 16, 2017.

(30) Foreign Application Priority Data

Dec. 6, 2016 (JP) .............................. JP2016-236717
May 11, 2017 (JP) .............................. JP2017-095043

(51) Int. Cl.
*G01J 1/42* (2006.01)
*B23K 26/00* (2014.01)
(Continued)

(52) U.S. Cl.
CPC ............ *G01J 1/4257* (2013.01); *B23K 26/00* (2013.01); *B23K 26/03* (2013.01); *B23K 26/21* (2015.10);
(Continued)

(58) Field of Classification Search
CPC combination set(s) only.
See application file for complete search history.

(56) References Cited

U.S. PATENT DOCUMENTS 7,982,935 B2   7/2011  Grapov et al.
10,478,923 B2 * 11/2019  Funaki ............... B23K 26/0626

FOREIGN PATENT DOCUMENTS

JP    62-190434    8/1987
JP    63-248586    10/1988
(Continued)

OTHER PUBLICATIONS

Extended European Search Report dated Feb. 28, 2020 in corresponding European Patent Application No. 17877619.1.
(Continued)

*Primary Examiner* — Tony Ko
(74) *Attorney, Agent, or Firm* — Wenderoth, Lind & Ponack, L.L.P.

(57) ABSTRACT

A laser device includes: a laser resonator for emitting a laser beam; a condenser lens for collecting the laser beam emitted from the laser resonator; an optical fiber for transmitting the laser beam collected by the condenser lens; at least one light sensor opposing a light receiving surface of the condenser lens and outside an optical path of the laser beam, the at least one light sensor detecting an amount of return light from the condenser lens; and a controller for determining a presence of an abnormality when a value of the amount detected by the at least one light sensor is greater than a predetermined maximum threshold.

5 Claims, 8 Drawing Sheets

(51) Int. Cl.
  *G01J 1/04* (2006.01)
  *B23K 26/03* (2006.01)
  *B23K 26/70* (2014.01)
  *H01S 3/00* (2006.01)
  *B23K 26/38* (2014.01)
  *B23K 26/21* (2014.01)

(52) U.S. Cl.
  CPC ............ *B23K 26/38* (2013.01); *B23K 26/705* (2015.10); *B23K 26/707* (2015.10); *G01J 1/0414* (2013.01); *G01J 1/0422* (2013.01); *G01J 1/0425* (2013.01); *G01J 1/4228* (2013.01); *H01S 3/00* (2013.01)

(56) References Cited

FOREIGN PATENT DOCUMENTS

| | | |
|---|---|---|
| JP | 2-107939 | 4/1990 |
| JP | 07-266067 | 10/1995 |
| JP | 11-097776 | 4/1999 |
| JP | 2001-246489 | 9/2001 |
| JP | 2001-339112 | 12/2001 |
| JP | 2005-214721 | 8/2005 |
| JP | 2012-091217 | 5/2012 |

OTHER PUBLICATIONS

International Search Report of PCT application No. PCT/JP2017/041182 dated Jan. 16, 2018.

\* cited by examiner

LASER DEVICE

CROSS-REFERENCE TO RELATED APPLICATION

This application is a U.S. national stage application of the PCT International Application No. PCT/JP2017/041182 filed on Nov. 16, 2017, which claims the benefit of foreign priority of Japanese patent applications No. 2016-236717 filed on Dec. 6, 2016 and No. 2017-095043 filed on May 11, 2017, the contents all of which are incorporated herein by reference.

TECHNICAL FIELD

The present invention relates to a laser device used for laser processing such as laser welding and laser cutting.

BACKGROUND ART

Well-known laser devices are used to apply a laser beam to a workpiece so as to weld or cut the workpiece with the beam (e.g., U.S. Pat. No. 7,982,935).

U.S. Pat. No. 7,982,935 discloses a laser device including a beam switch, which allows a laser beam from one laser oscillator to be emitted selectively from one of two optical fibers.

The beam switch includes a mirror for switching a laser beam; two condenser lenses for collecting the laser beam; and two optical fibers. The two optical fibers are connected to the respective laser processing heads so that the laser device can perform laser processing at different places and different timings.

SUMMARY

Technical Problem

In the above-mentioned conventional laser device, the optical components such as the mirror and the condenser lenses, and the optical fibers can be degraded with time due to the influence of, for example, ambient temperature or humidity. Moreover, the surfaces of the optical components and the optical fibers can be smeared with foreign matter in the ambient environment. These problems can cause a slight displacement in the laser beam emission.

In a laser device with a fiber optical system, even a submicroscopic displacement in the laser beam emission makes it impossible for the laser beam to strike the optical fiber with a small core diameter. As a result, the laser beam can strike and damage the peripheral region of the core.

The laser beam used for laser welding or laser cutting is as high as several to several tens of kilowatts. Therefore, only slight damage to the optical components or the optical fibers can lead to the failure of the entire laser device by exposure to the laser beam.

An object of the present invention, which has been made to overcome these disadvantages, is to prevent damage to the optical components or the optical fibers from leading to the failure of the entire laser device.

Solution to Problem

The laser device of the present invention includes the following components: a laser resonator for emitting a laser beam; a condenser lens for collecting the laser beam emitted from the laser resonator; and an optical fiber for transmitting the laser beam collected by the condenser lens.

To overcome the above-described disadvantages, the present invention further includes the following components: at least one light sensor opposing a light receiving surface of the condenser lens and outside the optical path of the laser beam, the at least one light sensor detecting the amount of return light from the condenser lens; and a controller for determining the presence of an abnormality when the value of the amount detected by any of the at least one light sensor is greater than the predetermined maximum threshold.

Advantageous Effects of Invention

According to the present invention, in the early stage of laser beam emission, an abnormality such as dirt or damage to the optical components or the optical fibers can be detected based on the amount of the return light detected by any of the light sensors.

DESCRIPTION OF EMBODIMENTS

The exemplary embodiments of the present invention will be described with reference to drawings. It should be understood that these embodiments are merely exemplary of the invention and do not limit the application of the present invention.

First Exemplary Embodiment

Figure 1:
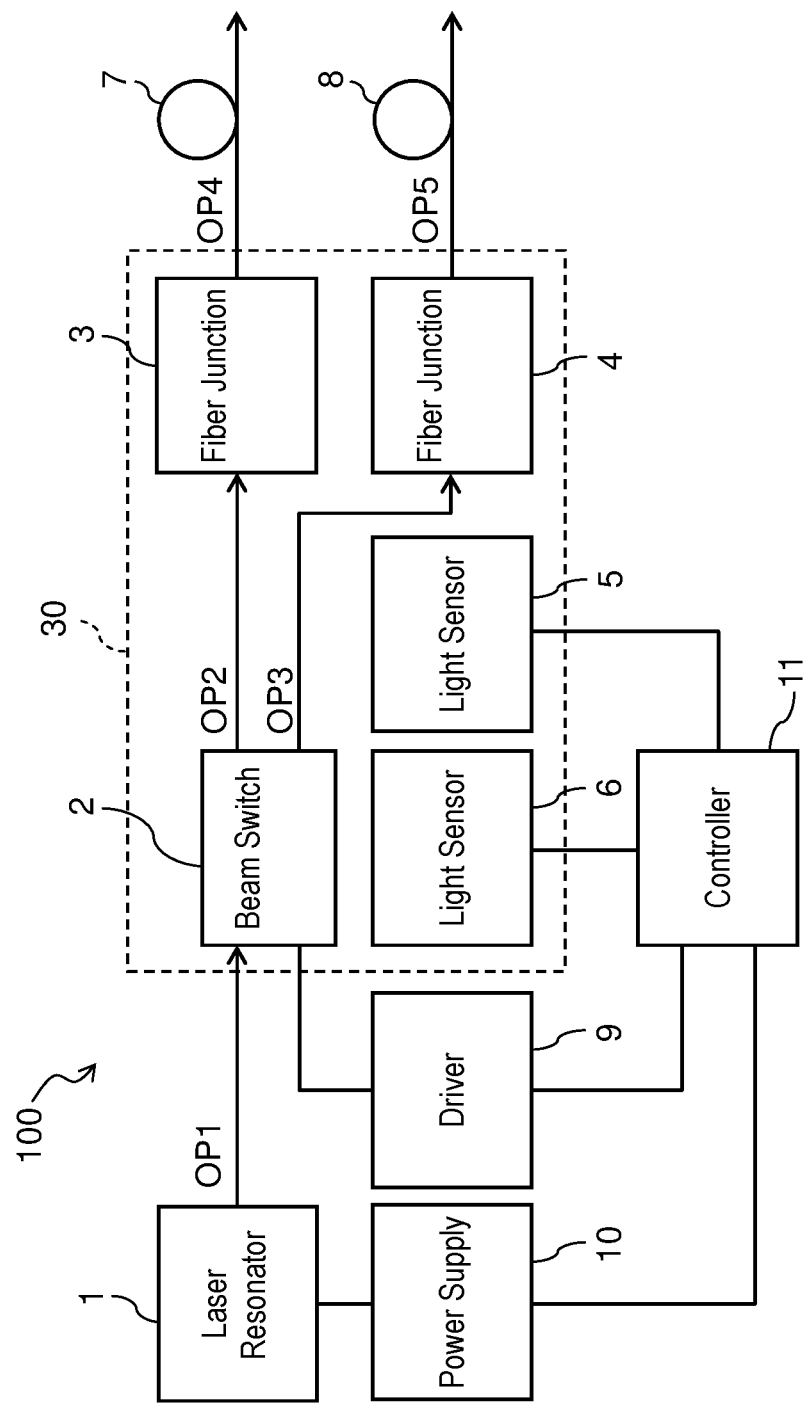
FIG. 1 is a schematic configuration of the laser device according to a first exemplary embodiment.

As show in FIG. 1, laser device 100 includes laser resonator 1, beam selector 30, and two optical fibers 7 and 8.

Laser resonator 1 collimates the laser beam obtained by laser resonance, and emits it as a laser beam OP1. Laser resonator 1 can be any of the following: a direct diode laser, a fiber laser, a disk laser, and an yttrium-aluminum-garnet (YAG) laser.

Beam selector 30 receives the laser beam OP1 from laser resonator 1 and allows the laser beam OP1 to be emitted selectively from one of optical fibers 7 and 8. Beam selector 30 includes beam switch 2, two fiber junctions 3 and 4, and two light sensors 5 and 6.

Beam switch 2 receives the laser beam OP1 from laser resonator 1 and emits it either as a laser beam OP2 to fiber junction 3 or as a laser beam OP3 to fiber junction 4.

Fiber junction 3 receives the laser beam OP2 and transmits a laser beam OP4 to optical fiber 7. Fiber junction 4 receives the laser beam OP3 and transmits a laser beam OP5 to optical fiber 8.

Laser device 100 further includes driver 9 connected to beam switch 2. Driver 9 rotates motors 13 and 17 (see FIG. 2). Laser device 100 further includes power supply 10 connected to laser resonator 1. Power supply 10 provides laser resonator 1 with laser oscillation power.

Light sensor 5 detects the amount of return light, which is reflected by fiber junction 3 and returned to the upstream side of fiber junction 3. Light sensor 6 detects the amount of return light, which is reflected by fiber junction 4 and returned to the upstream side of fiber junction 4. The output signals indicating the values of amounts detected by light sensors 5 and 6 are given to controller 11. The positions of light sensors 5 and 6 will be described later.

Controller 11 controls the operations of driver 9 and power supply 10 based on the output signals received from light sensors 5 and 6.

Beam switch 2 selectively outputs one of two laser beams (OP2, OP3) in the present exemplary embodiment, but may alternatively output three or more laser beams.

Beam selector 30 may include a housing (not shown), and the housing may store beam switch 2, fiber junctions 3 and 4, and light sensors 5 and 6.

Beam Switch

Figure 2:
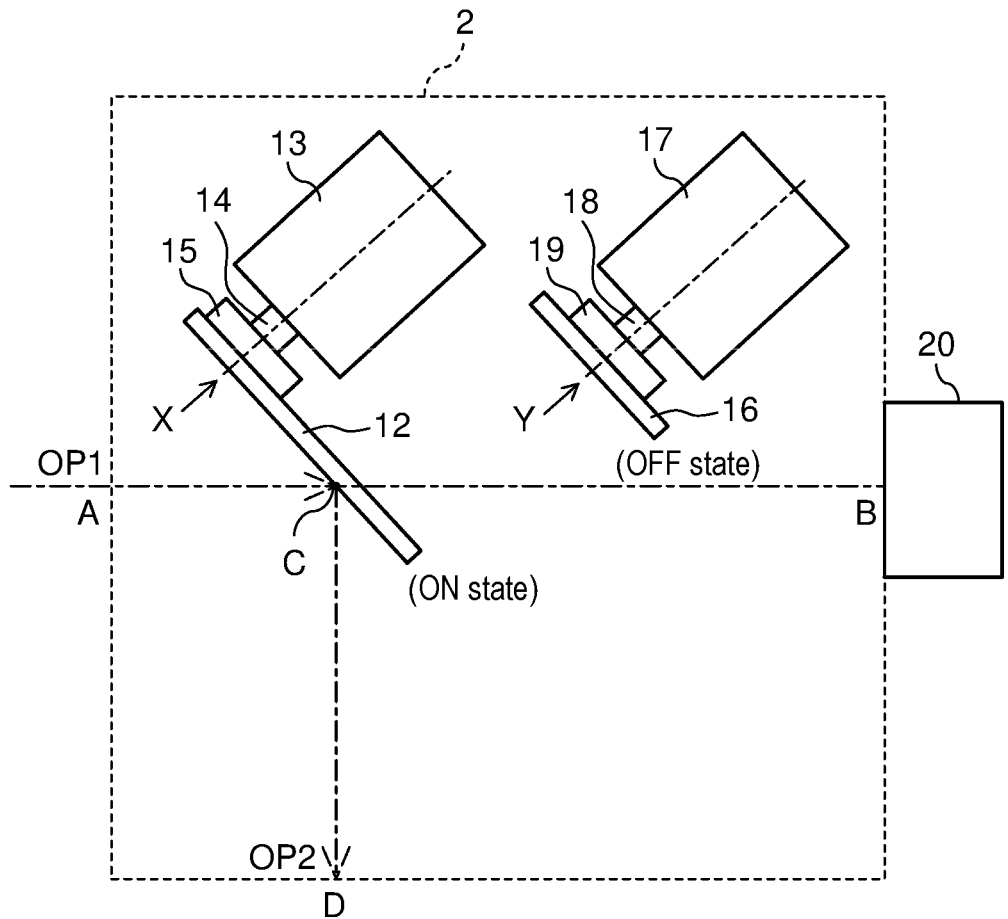
FIG. 2 is a schematic configuration of the beam switch according to the first exemplary embodiment.

As shown in FIG. 2, beam switch 2 changes the optical path by refracting the laser beam OP1. Unit 2 includes two mirrors 12 and 16, two motors 13 and 17 for rotating mirrors 12 and 16, and damper 20 for absorbing the energy of the laser beam OP1.

Mirror 12 is held by mirror holder 15, which is connected to motor 13 via motor shaft 14. The rotation of motor 13 is controlled by driver 9, which operates under the command of controller 11. Mirror 12 is moved by motor 13.

In the same manner, mirror 16 is held by mirror holder 19, which is connected to motor 17 via motor shaft 18. The rotation of motor 17 is controlled by driver 9, which operates under the command of controller 11. Mirror 16 is moved by motor 17.

Figure 3:
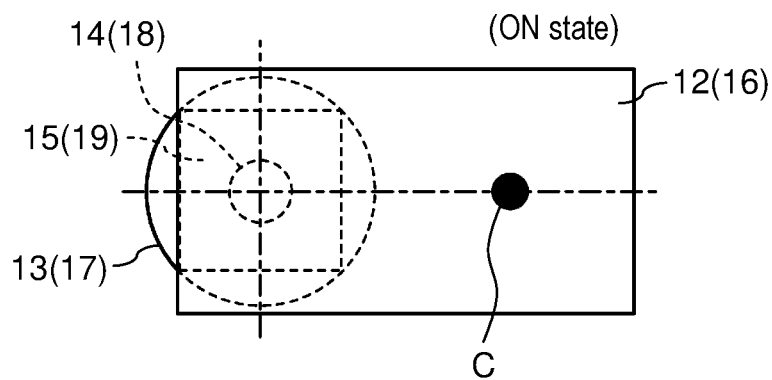
FIG. 3 is a diagram in which the mirrors are in the ON state.
Figure 4:
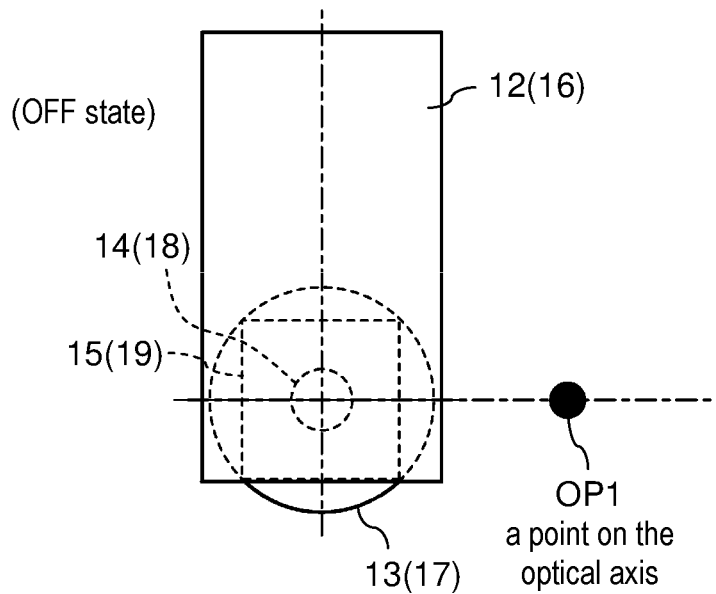
FIG. 4 is a diagram in which the mirrors are in the OFF state.

FIG. 3 a diagram in which mirrors 12 and 16 are in the ON state when seen in the directions X and Y, respectively, shown in FIG. 2. FIG. 4 is a diagram in which mirrors 12 and 16 are in the OFF state when seen in the directions X and Y, respectively, shown in FIG. 2.

As shown in FIGS. 3 and 4, mirrors 12 and 16 are flat with a rectangular reflective surface. Mirrors 12 and 16 are connected to mirror holders 15 and 19, respectively, at one end of the long side of the reflective surface. Mirrors 12, 16 and mirror holders 15, 19 rotate around motor shaft 14, 18, respectively, along with the rotation of motors 13, 17, respectively.

As shown in FIG. 3, mirror 12 or 16 is in the "ON state" when the other end of the long side of the reflective surface is lowered (mirror 12 or 16 is placed in landscape orientation). In the example shown in FIG. 3, the other end of mirror 12 or 16 is lowered until the long side of the reflective surface is parallel to the horizontal direction.

As shown in FIG. 4, mirror 12 or 16 is in the "OFF state" when the other end is raised (mirror 12 or 16 is placed in portrait orientation). In the example shown in FIG. 4, the other end of mirror 12 or 16 is raised until the long side of the reflective surface is parallel to the vertical direction. Beam switch 2 places mirror 12 in the ON state, or in other words, in the lowered position as shown in FIGS. 2 and 3. As a result, the laser beam OP1 strikes the point C of mirror 12, so that the optical axis AB of the laser beam OP1 is refracted at optical axis CD perpendicular to the horizontal plane. Thus, beam switch unit 2 outputs the laser beam OP2. At this moment, as shown in FIG. 4, mirror 16 is in the OFF state, or in other words, is in the raised position (see FIG. 4).

In the actual laser processing, controller 11 sets mirror 12 to the ON state first and then sets power supply 10 to the ON state before outputting the laser beam OP1. When the laser processing is completed, controller 11 places power supply 10 in the OFF state to stop the laser output. After this, controller 11 places mirror 12 in the OFF state.

Figure 5:
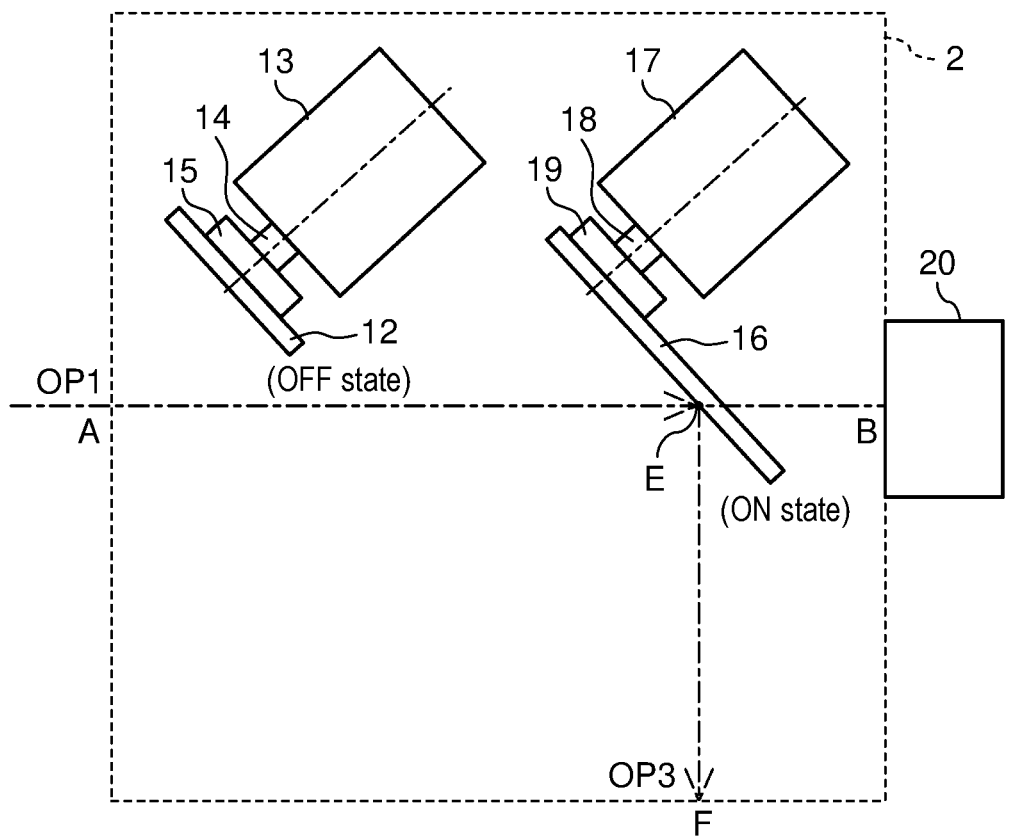
FIG. 5 is a schematic configuration of the beam switch when the mirrors are switched from one to the other.

Meanwhile, as shown in FIGS. 4 and 5, when beam switch 2 places mirror 12 in the OFF state, or in other words, in the raised position, laser beam OP1 is led straight along mirror 12. At this moment, as shown in FIG. 3, mirror 16 is placed in the ON state, or in other words, in the lowered position. As a result, the laser beam OP1 strikes the point of mirror 16, so that the optical axis AB of the laser beam OP1 is refracted at optical axis EF perpendicular to the horizontal plane. Thus, the beam switch 2 outputs the laser beam OP3.

Damper 20 is disposed to face the incident laser beam OP1 such that the optical axis of the laser beam OP1 coincides with the center position of damper 20.

Damper 20 is used to absorb energy of the laser beam OP1 in case that the laser beam OP1 is led straight due to an abnormality (e.g., the rotation failure or the dropping off of mirrors 12 and 16) during laser processing. The laser beam OP1 is never applied directly to damper 20 when laser device 100 is in the normal state.

Fiber Junction

Figure 6:
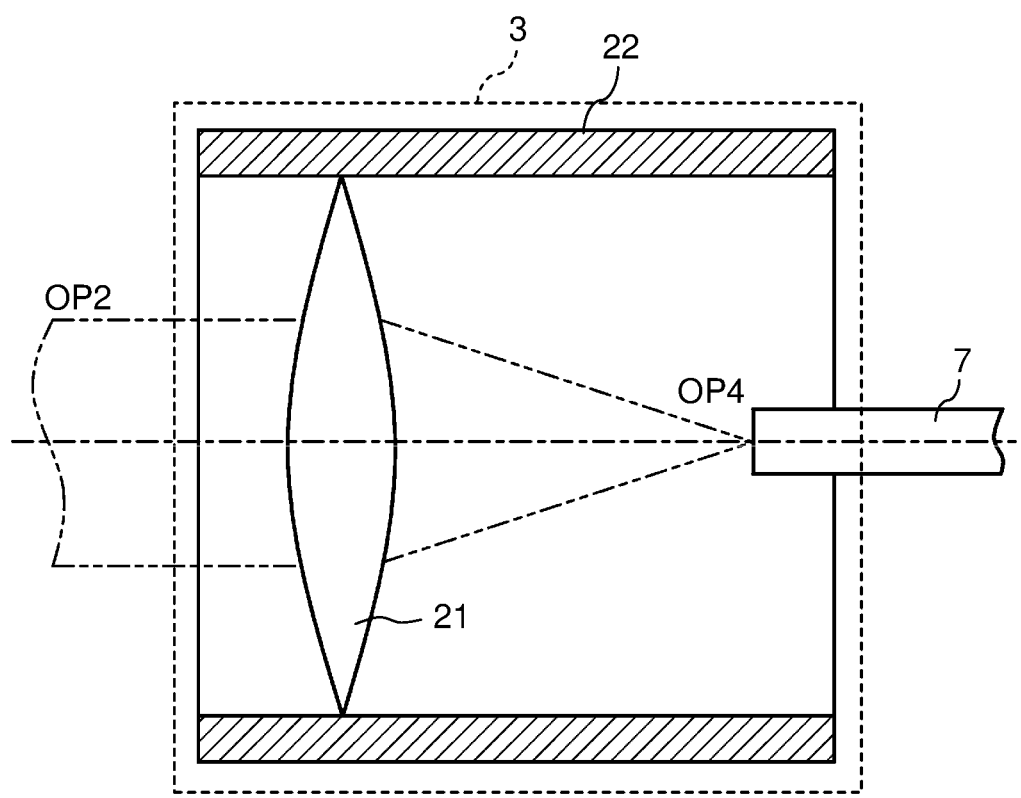
FIG. 6 is a schematic configuration of the fiber junction.

As shown in FIG. 6, fiber junction 3 includes condenser lens 21 and optical system holder 22, which holds condenser lens 21 and optical fiber 7. Fiber junction 4, which has the same configuration as fiber junction 3, will not be described here.

Condenser lens 21 collects the laser beam OP2 incident on fiber junction 3 and makes the beam OP2 strike optical fiber 7 as the laser beam OP4.

Optical system holder 22 has the shape of a cylinder in which condenser lens 21 is fitted. In optical system holder 22, one end of optical fiber 7 is held downstream of condenser lens 21. Optical fiber 7 is held such that its optical axis coincides with the optical axis of laser beam OP4 and can receive the entire laser beam OP4 collected by condenser lens 21.

Although not illustrated, optical system holder 22 may include an adjustment mechanism for moving the end of optical fiber 7 along the optical axis of the laser beam OP2. Alternatively, optical system holder 22 may include an adjustment mechanism for moving the end of optical fiber 7 orthogonally to the optical axis of the laser beam OP2.

Optical system holder 22 is composed of one cylindrical member in the present exemplary embodiment, but may alternatively be composed of, for example, two separate members: a part for holding condenser lens 21 and a part for holding the end of optical fiber 7. Condenser lens 21 and optical fiber 7 may be attached to the respective parts first and combined together later.

Condenser lens 21 is composed of a single lens in the present exemplary embodiment, but may alternatively be a combination of lenses. Using a combination of lenses could reduce aberration, allowing the laser beam OP4 to strike optical fiber 7 more efficiently.

The Layout of Light Sensor

Light sensor 5 is disposed outside the optical path of the laser beam OP2 striking the fiber junction 3 and opposes a light receiving surface of condenser lens 21.

Figure 7:
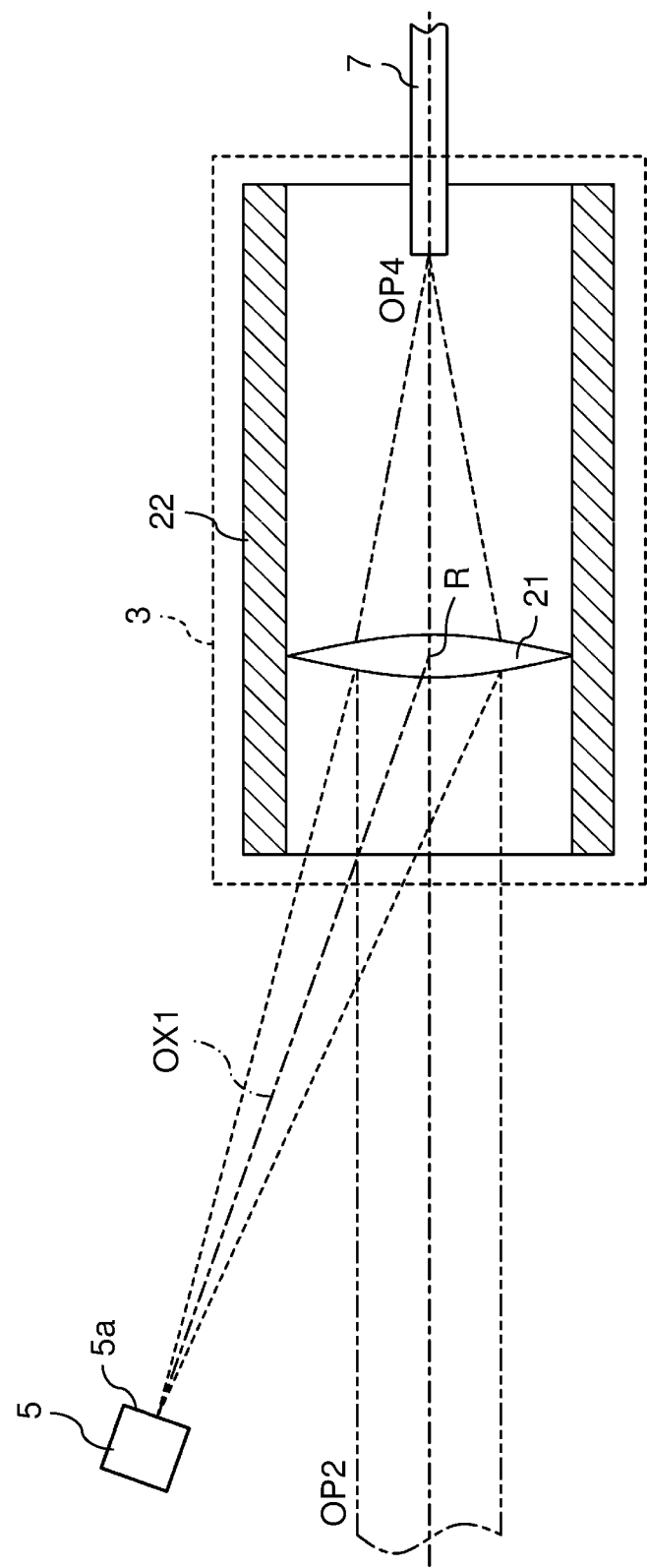
FIG. 7 is a schematic diagram showing the arrangement of the light sensor.

To be more specific, as shown in FIG. 7, light sensor 5 is disposed diagonally behind the direction in which the laser beam OP2 strikes fiber junction 3. Light sensor 5 has light-receiving surface 5a for receiving return light. Light-receiving surface 5a faces the central portion of condenser lens 21 and is disposed orthogonal to the central axis OX1 of light sensor 5.

The expression "light-receiving surface 5a faces the central portion of condenser lens 21" means to make the central axis OX1 of light sensor 5 and the central axis of condenser lens 21 cross each other at the center point R of condenser lens 21 as shown in FIG. 7.

Light sensor 5 has maximum light sensitivity at the central axis OX1. Hence, disposing light sensor 5 as described as above can maximize the amount of the return light entering light sensor 5. This improves the accuracy of fault determination (described later) performed by controller 11.

The layout of light sensor 6 with respect to fiber junction 3 is the same as that of light sensor 5, so that its description will be omitted here.

When the laser is outputted, or in other words, when the laser beam OP2 strikes fiber junction 3, part of the laser beam is reflected from the surface of condenser lens 21. This reflected light is detected as the return light by light sensor 5.

Similarly, when the laser beam OP2 is collected by condenser lens 21 and strikes optical fiber 7 as the laser beam OP4, part of the laser beam is reflected from the end face of optical fiber 7. The reflected light is led to light sensor 5 via condenser lens 21 and is detected as return light by light sensor 5.

Thus, when the laser beam OP2 is emitted, the return light from condenser lens 21 or from the end face of optical fiber 7 is detected by light sensor 5.

The Principle of Operation of the Light Sensor

The principle of operation of light sensor 5 will now be described with reference to FIGS. 8 and 9. The principle of operation of light sensor 6 is the same as that of light sensor 5, so that its description will be omitted here.

In the actual laser processing, the amount of the return light detected by light sensor 5 differs depending on the laser output (the intensity of the laser beam OP2). However, when the laser output is constant, the amount of the return light is comparatively small as long as condenser lens 21 and the end face of optical fiber 7 are in the normal state.

The reason for this is as follows. The reflection from condenser lens 21 or from the end face of optical fiber 7 causes a loss. To reduce the loss, the reflection in used laser wavelengths is usually minimized by coating the surface of condenser lens 21 and the end face of optical fiber 7.

Meanwhile, if condenser lens 21 or the end face of optical fiber 7 is smeared during laser application and then the coating or the optical components are damaged, the reflection of the laser beam OP2 rapidly increases. Consequently, the amount of the return light entering light sensor 5 rapidly increases.

Figure 8:
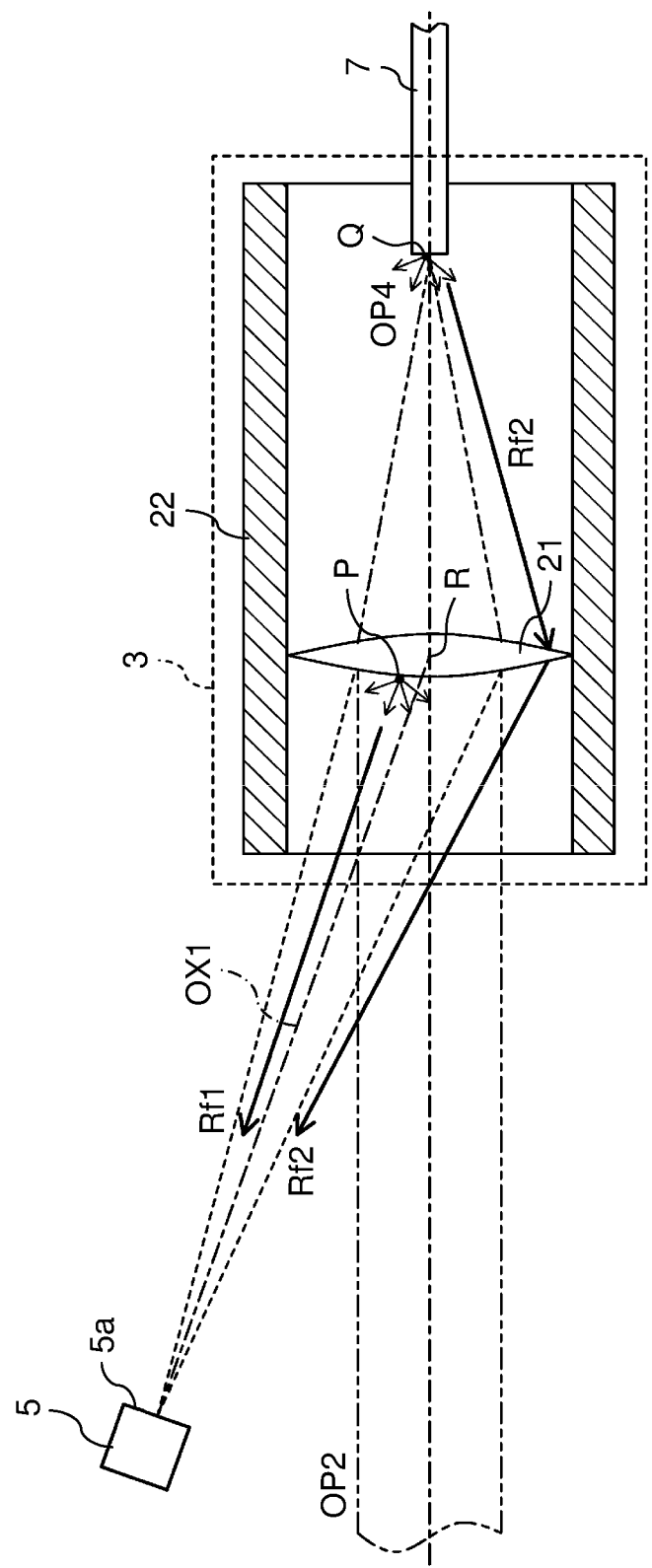
FIG. 8 is a schematic diagram showing light reflection when the condenser lens or the end face of the optical fiber is damaged.

As shown in FIG. 8, condenser lens 21 can be smeared or damaged at a point P on its surface. In this case, the reflection of the laser beam OP2 increases at the point P, thereby rapidly increasing the amount of light Rf1, which is reflected and enters light sensor 5.

Similarly, optical fiber 7 can be smeared or damaged at a point Q on its end face. In this case, the reflection of the laser beam OP4 increases at the point Q, thereby rapidly increasing the amount of light Rf2, which is reflected and enters light sensor 5 via condenser lens 21.

Using this phenomenon, controller 11 performs the following determinations based on the signal received from light sensor 5 while the laser beam OP4 is being outputted. The signal indicates the value of the amount detected by light sensor 5. Controller 11 previously stores a maximum threshold S-ref1 and a normal S-nor of return light corresponding to the laser output value shown in FIG. 9. Controller 11 acquires the value of the amount detected by light sensor 5 and the laser output value. If the value of the amount detected by light sensor 5 is smaller than the maximum threshold S-ref1 and is the normal S-nor corresponding to the laser output value, controller 11 determines fiber junction 3 to be in the normal state. In other words, controller 11 determines that condenser lens 21 and the end face of optical fiber 7 are not smeared or damaged.

In this case, the output of power supply 10 is adjusted such that the value of the amount detected by light sensor 5 agrees with the normal S-nor corresponding to the laser output value. As a result, the laser output value is converged to a target value. Thus, controller 11 keeps the value of the amount detected by light sensor 5 constant, thereby obtaining a stable laser output value.

Figure 9:
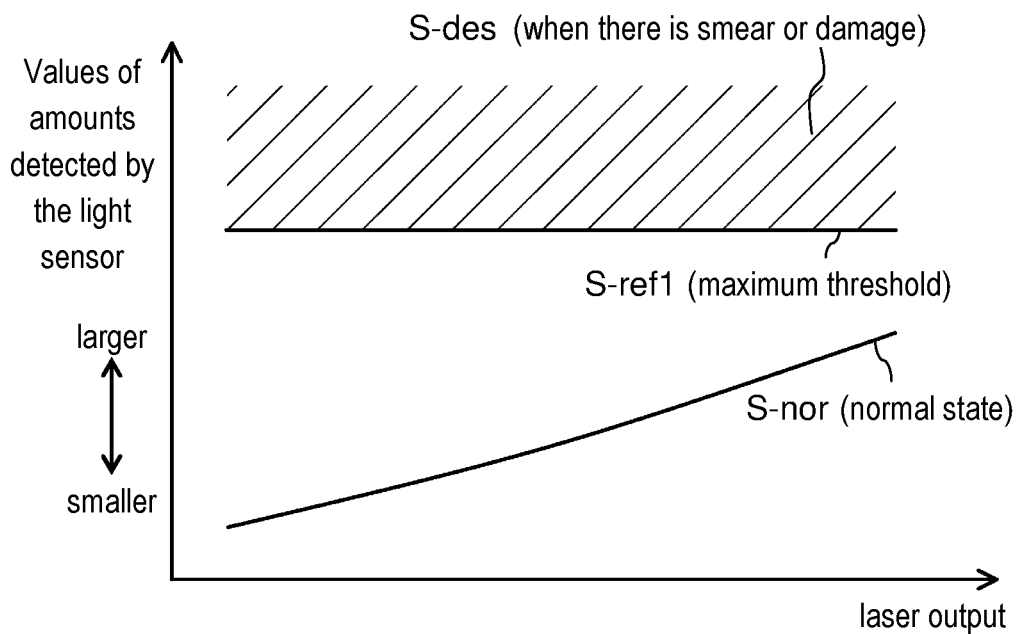
FIG. 9 shows the values used when the controller performs determinations.

Meanwhile, when the value of the amount detected by light sensor 5 is greater than the maximum threshold S-ref1 and is a S-des shown in FIG. 9, controller 11 determines fiber junction 3 to be in the abnormal state. In other words, controller 11 determines that condenser lens 21 and the end face of optical fiber 7 are smeared or damaged. Since the intensity of the return light differs depending on the degree of damage, the S-des is shown by a hatched area with some width.

Thus, controller 11 determines whether fiber junction 3 is in the abnormal state.

Controller 11 in the present exemplary embodiment determines whether the value of the amount detected by light sensor 5 is the normal S-nor corresponding to the laser output value, but this is not an essential requirement. Controller 11 has only to determine whether the value of the amount detected by light sensor 5 is smaller than the predetermined maximum threshold S-ref1. In this case, controller 11 does not have to store the normal S-nor.

The Operation and Effects of the Laser Device

The operation and effects of laser device 100 will now be described as follows.

To start the laser processing, as shown in FIG. 1, controller 11 makes driver 9 control beam selector 30 so that the laser beam OP1 generated by laser resonator 1 can be emitted selectively from one of optical fibers 7 and 8. As a result, either the laser beam OP4 or the laser beam OP5 is used for laser processing.

If the value of the amount detected by light sensor 5 is greater than the maximum threshold S-ref1 (see FIG. 9) during the output of the laser beam OP4, controller 11 determines the presence of an abnormality. In other words, controller 11 determines that condenser lens 21 or the end face of optical fiber 7 in fiber junction 3 is smeared or damaged.

Similarly, if the value of the amount detected by light sensor 6 is greater than the maximum threshold S-ref1 during the output of laser beam OP5, controller 11 determines the presence of an abnormality. In other words, controller 11 determines that condenser lens 21 or the end face of optical fiber 8 in fiber junction 4 is smeared or damaged.

Upon determination of the abnormality, controller 11 makes power supply 10 immediately shut down the power supply to laser resonator 1, thereby stopping the laser oscillation. This prevents damage expansion in laser device 100.

Second Exemplary Embodiment

Figure 10:
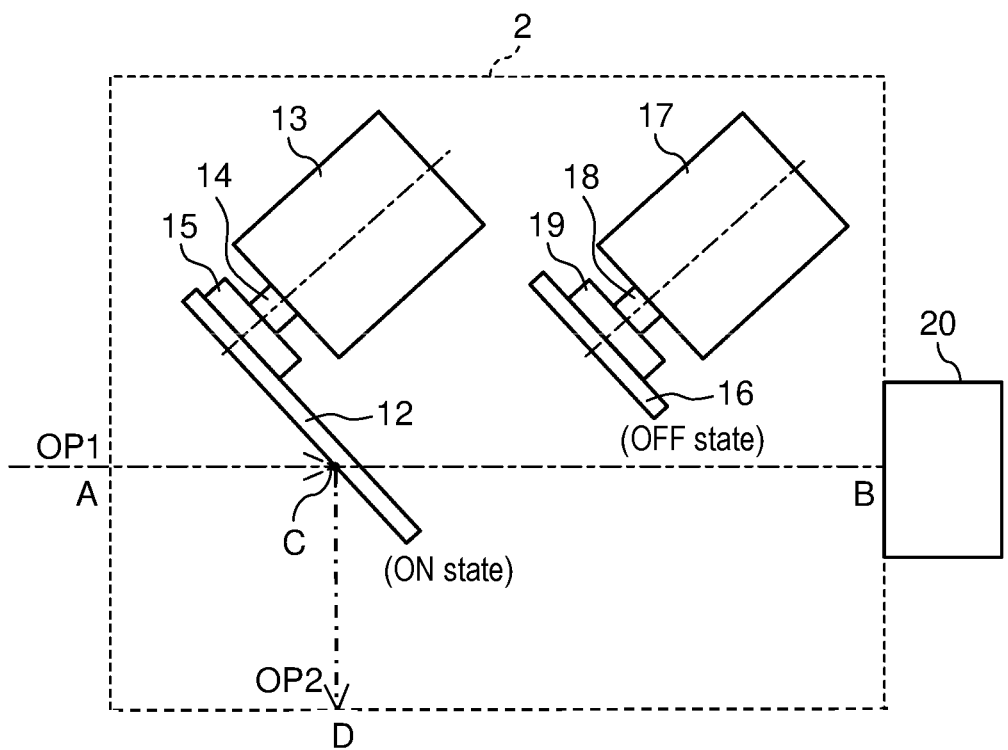
FIG. 10 is a schematic configuration of the beam switch in the laser device according to the second exemplary embodiment.

FIG. 10 is a schematic configuration of the beam switch in the laser device according to a second exemplary embodiment. In this exemplary embodiment, like components are labeled with like reference numerals with respect to the first exemplary embodiment, and the following description will be focused on the difference between these embodiments.

In the example shown in FIG. 10, mirror 12 is in the ON state, or in other words, in the lowered position. As a result, the laser beam OP1 strikes the point C of mirror 12, so that the optical axis AB of the laser beam OP1 is refracted at the optical axis CD perpendicular to the horizontal plane. Thus, beam switch 2 outputs the laser beam OP2. At this moment, mirror 16 is in the OFF state, or in other words, in the raised position.

Figure 11:
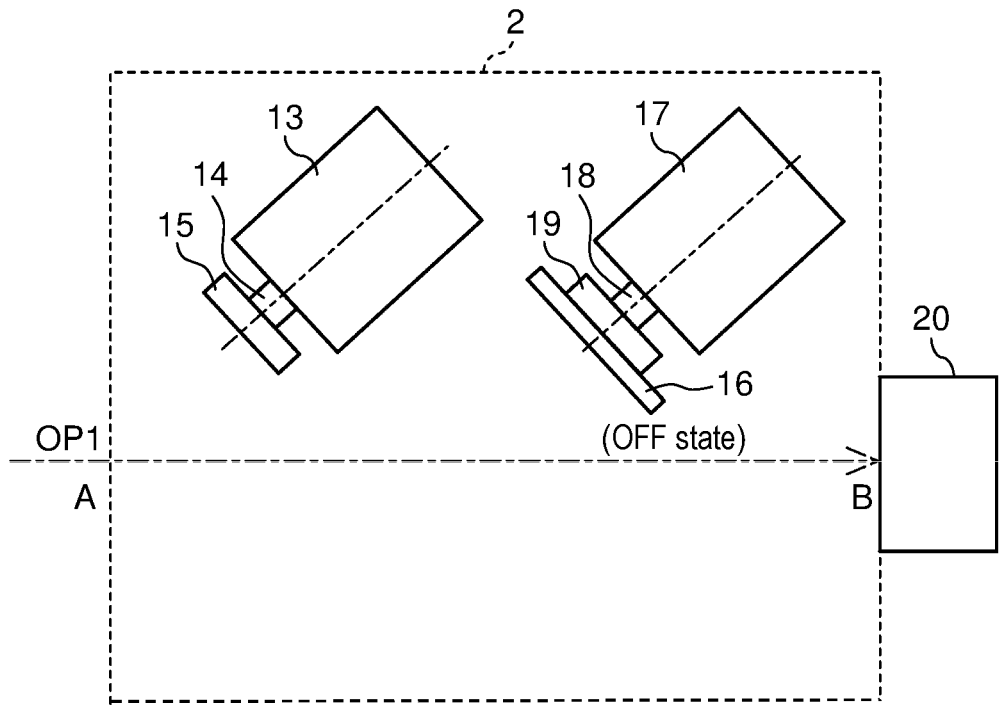
FIG. 11 is a schematic diagram showing how the laser beam emission is led when one mirror has dropped off.

If dropping off from mirror holder 15 due, for example, to deterioration with time or attachment failure, mirror 12 appears as shown in FIG. 11.

In this case, the laser beam OP1 is not refracted by mirror 12 but is led straight. At this moment, mirror 16 is in the OFF state, so that the laser beam OP1 is led straight along mirror 16 and applied directly to damper 20. In this case, although not illustrated, almost no return light from condenser lens 21 of fiber junction 3 enters light sensor 5, thereby rapidly decreasing the output of light sensor 5.

Figure 12:
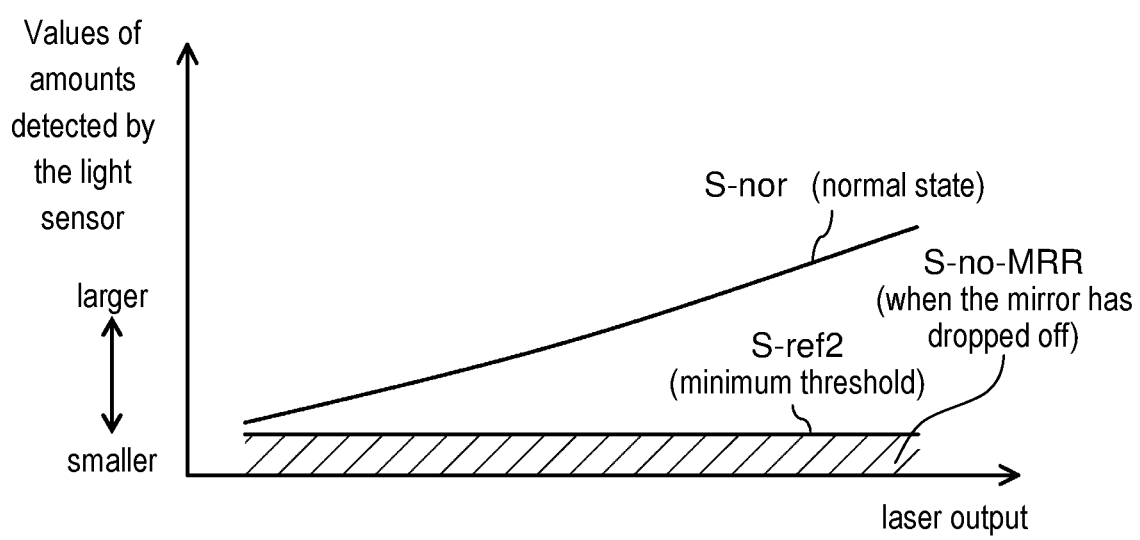
FIG. 12 shows the values used when the controller performs determinations.

Using this phenomenon, controller 11 performs the following determinations based on the signal received from light sensor 5 while the laser beam OP1 is being outputted. The signal indicates the value of the amount detected by light sensor 5. Controller 11 in the second exemplary embodiment previously stores a minimum threshold S-ref2 shown in FIG. 12. Controller 11 acquires the value of the amount detected by light sensor 5. If the value of the amount detected by light sensor 5 is a S-no-MRR, which is smaller than the minimum threshold S-ref2, controller 11 determines the presence of an abnormality, or in other words, that the mirror 12 has dropped off or has been damaged. Similarly, controller 11 can perform determination whether mirror 16 has dropped off, based on the value of the amount detected by light sensor 6.

Upon determination of the abnormality, controller 11 makes power supply 10 immediately shut down the power supply to laser resonator 1, thereby stopping the laser oscillation. This prevents damage expansion in laser device 100.

It is possible to combine the first and second exemplary embodiments. To be more specific, controller 11 may compare the values of the amounts detected by light sensors 5 and 6 with the predetermined maximum threshold S-ref1 and the predetermined minimum threshold S-ref2, respectively. In this case, if the values of the amounts detected by light sensors 5 and 6 are either not less than the maximum threshold S-ref1 or not more than the minimum threshold S-ref2, controller 11 determines the presence of an abnormality. Thus, using both the maximum and minimum thresholds enables controller 11 to detect at an early stage whether condenser lens 21, or optical fiber 7 or 8 is smeared or damaged or whether mirror 12 or 16 has dropped off or has been damaged.

According to the first and second exemplary embodiments, laser device 100 includes two fiber junctions 3, 4 and two optical fibers 7, 8, and beam switch 2 switches between these optical fibers to output a laser beam. In the present invention, however, laser device 100 does not necessarily have to switch the output of the laser beam. Laser device 100 may include the following components: laser resonator 1 for emitting a laser beam; condenser lens 21 for collecting the laser beam emitted from laser resonator 1; optical fiber 7 for transmitting the laser beam collected by condenser lens 21; light sensor 5 opposing a light receiving surface of the condenser lens 21 and outside the optical path of the laser beam, light sensor 5 detecting the amount of return light from the condenser lens; and controller 11 for determining the presence of an abnormality when the value of the amount detected by light sensor 5 is greater than the predetermined maximum threshold.

In the first and second exemplary embodiments, one laser beam corresponds to one light sensor, but may alternatively correspond to a plurality of light sensors. The plurality of light sensors may be arranged at regular intervals along the optical path to the condenser lens. In this case, the average of the values of the amounts detected by the plurality of light sensors can be used to detect the amount of the return light more accurately, thereby coping with the displacement of the components.

The present invention may include the following components: at least one light sensor opposing a light receiving surface of the condenser lens and outside the optical path of the laser beam, the at least one light sensor detecting the amount of return light from the condenser lens; and a controller for determining the presence of an abnormality when the value of the amount detected by any of the at least one light sensor is greater than the predetermined maximum threshold.

This configuration prevents damage to the optical components from spreading to the entire the laser device.

To be more specific, the at least one light sensor opposing the light receiving surface of the condenser lens and outside the optical path of the laser beam detects the amount of return light from the condenser lens.

In this case, if the value of the amount detected by any of the at least one light sensor is smaller than the predetermined maximum threshold, it can be determined that the optical components such as the condenser lens and the end face of the optical fiber are in the normal state, or in other words, are not smeared or damaged. As a result, laser oscillation can be continued.

On the other hand, when the value of the amount detected by any of the at least one light sensor is greater than the maximum threshold, it is determined that there is an abnormality, or in other words, the condenser lens and the end face of the optical fiber is smeared or damaged. It is further determined that the laser beam is reflected more strongly, thereby increasing the amount of return light led to the light sensor via the condenser lens.

Upon determination of the abnormality, the power supply to the laser resonator can be immediately shut down to stop laser oscillation. This prevents damage expansion in the laser device.

INDUSTRIAL APPLICABILITY

As described above, the present invention has a practical effect of preventing the spread of failure of the laser device due, for example, to damage to the optical components and the optical fibers. Thus, the present invention provides high industrial applicability.

REFERENCE MARKS IN THE DRAWINGS 1 laser resonator
2 beam switch
3 fiber junction
4 fiber junction
5 light sensor
5a light-receiving surface
6 light sensor
7 optical fiber
8 optical fiber
9 driver
10 power supply
11 controller
12 mirror
13 motor
14 motor shaft
15 mirror holder
16 mirror
17 motor
18 motor shaft
19 mirror holder
20 damper
21 condenser lens
22 optical system holder
30 beam selector
100 laser device

The invention claimed is:

1. A laser device comprising:
a laser resonator configured to emit a laser beam;
a condenser lens configured to collect the laser beam emitted from the laser resonator;
an optical fiber configured to transmit the laser beam collected by the condenser lens;
at least one light sensor opposing a light receiving surface of the condenser lens and outside an optical path of the laser beam, the at least one light sensor being configured to detect an amount of return light from the condenser lens and the optical fiber;
a power supply configured to supply laser oscillation power to the laser resonator; and
a controller,
wherein the laser device is configured to:
reflect a part of the laser beam from the condenser lens;
lead a light reflected from the condenser lens to the at least one light sensor and detect the light as the return light from the condenser lens by the at least one light sensor;
reflect a part of the laser beam from the optical fiber; and
lead a light reflected from the optical fiber to the at least one light sensor via the condenser lens and detect the light as the return light from the optical fiber by the at least one light sensor, and
wherein the controller is configured to:
determine a presence of a first abnormality when a value of the amount detected by the at least one light sensor is greater than a predetermined maximum threshold; and
cause, in response to determination of the presence of the first abnormality, the power supply to shut down supplying the laser oscillation power to the laser resonator, and
wherein the controller is further configured to:
determine a presence of a second abnormality when the value of the amount detected by the at least one light sensor is smaller than a predetermined minimum threshold; and
cause, in response to determination of the presence of the second abnormality, the power supply to shut down supplying the laser oscillation power to the laser resonator.

2. The laser device according to claim 1, wherein the at least one light sensor has a light-receiving surface for receiving the return light, the light-receiving surface facing a central portion of the condenser lens.

3. The laser device according to claim 2, wherein the at least one light sensor has a central axis perpendicular to the light-receiving surface, the central axis of the at least one light sensor crossing a central axis of the condenser lens at a center point of the condenser lens.

4. The laser device according to claim 1, wherein the at least one light sensor comprises a plurality of light sensors.

5. The laser device according to claim 1,
wherein the controller is configured to control the power supply such that the value of the amount detected by the at least one light sensor is individually constant.

* * * * *